United States Patent
Tamura et al.

(10) Patent No.: US 9,971,047 B2
(45) Date of Patent: May 15, 2018

(54) PHOTON-COUNTING TYPE X-RAY CT APPARATUS

(71) Applicant: Toshiba Medical Systems Corporation, Otawara-shi (JP)

(72) Inventors: Emi Tamura, Nasushiobara (JP); Yasuo Saito, Nasushiobara (JP)

(73) Assignee: Toshiba Medical Systems Corporation, Otawara-shi (JP)

( * ) Notice: Subject to any disclaimer, the term of this patent is extended or adjusted under 35 U.S.C. 154(b) by 72 days.

(21) Appl. No.: 14/813,557

(22) Filed: Jul. 30, 2015

(65) Prior Publication Data

US 2016/0033654 A1     Feb. 4, 2016

(30) Foreign Application Priority Data

Jul. 30, 2014   (JP) ................. 2014-155508

(51) Int. Cl.
   *G01T 1/17*    (2006.01)
   *G01T 1/29*    (2006.01)

(52) U.S. Cl.
   CPC ................ *G01T 1/2985* (2013.01)

(58) Field of Classification Search
   CPC ....... A61B 6/032; A61B 6/4241; A61B 6/482; G01N 23/046
   See application file for complete search history.

(56) References Cited

U.S. PATENT DOCUMENTS

| 5,699,399 | A | * | 12/1997 | Ozaki | G01N 23/046 378/4 |
| 2008/0260094 | A1 | * | 10/2008 | Carmi | A61B 6/032 378/19 |
| 2013/0010921 | A1 | | 1/2013 | Sagoh et al. | |
| 2013/0251097 | A1 | * | 9/2013 | Zou | A61B 6/032 378/9 |
| 2015/0223766 | A1 | * | 8/2015 | Besson | G01T 1/2985 378/5 |

FOREIGN PATENT DOCUMENTS

JP     5653121     1/2015

* cited by examiner

*Primary Examiner* — Hoon Song
(74) *Attorney, Agent, or Firm* — Oblon, McClelland, Maier & Neustadt, L.L.P.

(57) ABSTRACT

Provided is a photon-counting type X-ray CT apparatus according to embodiments including a detector, a first collecting unit, a second collecting unit, and an image reconstruction unit. The detector detects an X-ray and outputs a signal. The first collecting unit collects count data of photons of the X-ray for every energy band with a predetermined time width by using the signal output from the detector. The second collecting unit corrects integration data obtained by integrating the signal with the predetermined time width by using the signal output from the detector. The image reconstruction unit corrects the count data by using the integration data. The image reconstruction unit generates a reconstructed image by performing a reconstructing process on the corrected count data.

12 Claims, 8 Drawing Sheets

PHOTON-COUNTING TYPE X-RAY CT APPARATUS

CROSS-REFERENCE TO RELATED APPLICATIONS

This application is based upon and claims the benefit of priority from Japanese Patent Application No. 2014-155508, filed on Jul. 30, 2014, the entire contents of which are incorporated herein by reference. The entire contents of the prior Japanese Patent Application No. 2015-149477, filed on Jul. 29, 2015, are also incorporated herein by reference.

FIELD

Embodiments described herein relate generally to a photon-counting type X-ray CT apparatus.

BACKGROUND

In recent years, photon-counting type X-ray CT apparatuses of performing photon counting computed tomography (CT) by using a photon-counting type detector have been developed. Unlike an integration type detector used for an X-ray CT apparatus of the related art, the photon-counting type detector outputs a signal capable of individually counting X-ray photons transmitting through a test object. Therefore, in the photon counting CT, an X-ray CT image having a high signal to noise (SN) ratio can be reconstructed.

In the above-described photon counting CT, as the detector, a direct-conversion type semiconductor detector made of cadmium telluride (CdTe), cadmium zinc telluride (CdZnTe), or the like, an indirect-conversion type detector such as scintillator, or the like is used. Since the signal of such a detector is weak, in general, integrated circuitry such as an application specific integrated circuit (ASIC) is arranged in the vicinity of the detector.

In the ASIC used as a detector in photon counting CT, for example, a pre-amplifier is arranged at the first stage to perform signal amplification, and at the subsequent stage, a waveform of the signal is shaped, so that incident X-ray photons are discriminated into a plurality of energy bands according to energy of the photons. Accordingly, in the photon counting CT, images of the plurality of the energy bands can be simultaneously acquired, and a reconstructed image of a plurality of substances can be acquired.

DETAILED DESCRIPTION

According to an embodiment, a photon-counting type X-ray CT apparatus includes a detector and processing circuitry. The detector configured to detect X-rays and output a signal. The processing circuitry configured to collect count data of photons of the X-rays for every energy band with a predetermined time width by using the signal output from the detector. The processing circuitry configured to collect integration data obtained by integrating the signal with the predetermined time width by using the signal output from the detector. The processing circuitry configured to correct the count data by using the integration data. The processing circuitry configured to generate a reconstructed image by performing a reconstructing process on the count data corrected.

Hereinafter, embodiments of a photon-counting type X-ray CT apparatus will be described in detail with reference to the attached drawings. Hereinafter, in embodiments, components denoted by the same reference numeral perform the same operation, and redundant description thereof is appropriately omitted.

First Embodiment

Figure 1:
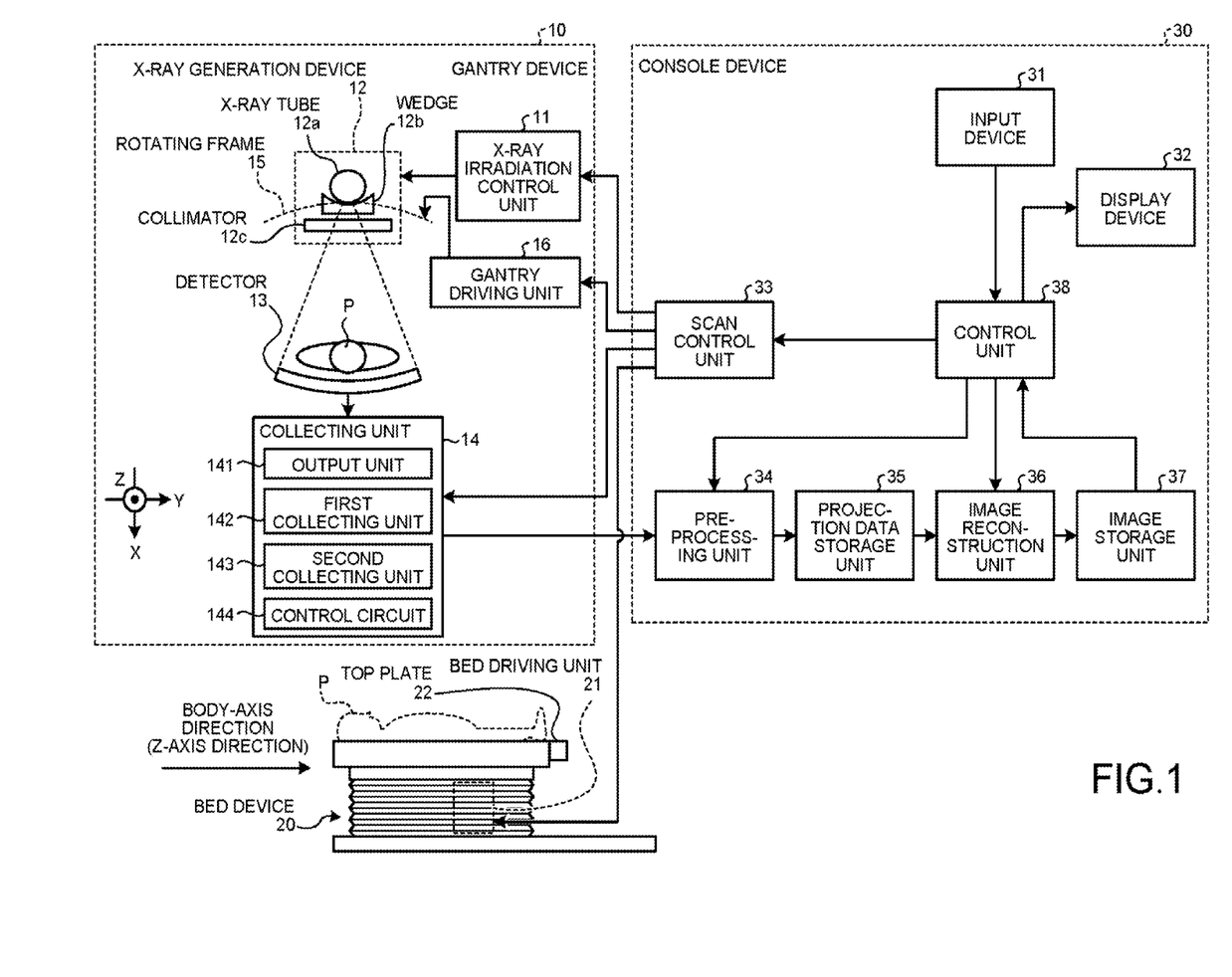
FIG. 1 is a diagram illustrating an example of a configuration of a photon-counting type X-ray CT apparatus according to a first embodiment.

First, a configuration of a photon-counting type X-ray CT apparatus according to a first embodiment will be described. FIG. 1 is a diagram illustrating an example of a configuration of the photon-counting type X-ray CT apparatus according to the first embodiment. As illustrated in FIG. 1, the photon-counting type X-ray CT apparatus according to the first embodiment includes a gantry device 10, a bed device 20, and a console device 30.

The gantry device 10 is a device which irradiates a test object P with X-rays and counts the X-rays transmitting through the test object P and includes an X-ray irradiation control unit 11, an X-ray generation device 12, a detector 13, a collecting unit 14, a rotating frame 15, and a gantry driving unit 16.

The rotating frame 15 is a ring-shaped frame which supports the X-ray generation device 12 and the detector 13 so as to face each other with the test object P being interposed therebetween and rotates about the test object P as a center of rotation along a circular path at a high speed by the gantry driving unit 16 described later.

The X-ray generation device 12 is a device of generating X-rays and irradiating the test object P with the generated X-rays and includes an X-ray tube 12a, a wedge 12b, and a collimator 12c.

The X-ray tube 12a is a vacuum tube which irradiates the test object P with an X-ray beam by a high voltage supplied by the X-ray irradiation control unit 11 described later. The X-ray tube irradiates the test object P with the X-ray beam along with rotation of the rotating frame 15. The X-ray tube 12a generates the X-ray beam spreading with a fan angle and a cone angle.

The wedge 12b is an X-ray filter for adjusting an X-ray amount of the X-rays emitted from the X-ray tube 12a. More specifically, the wedge 12b is a filter which transmits and attenuates the X-rays emitted from the X-ray tube 12a so that the X-rays irradiated on the test object P by the X-ray tube 12a have a predefined distribution. For example, the wedge 12b is a filter formed by processing aluminum so as to have a predetermined target angle or a predetermined thickness. In addition, the wedge is sometimes called a wedge filter or a bow-tie filter.

The collimator 12c is a slit for narrowing an irradiation range of the X-rays of which X-ray amount is adjusted by the wedge 12b under the control of the X-ray irradiation control unit 11 described later.

The X-ray irradiation control unit 11 is a high voltage generation unit which supplies a high voltage to the X-ray tube 12a. The X-ray tube 12a generates the X-rays by using the high voltage supplied from the X-ray irradiation control unit 11. The X-ray irradiation control unit 11 adjusts the X-ray amount irradiated on the test object P by adjusting a tube voltage or a tube current supplied to the X-ray tube 12a. In addition, the X-ray irradiation control unit 11 performs switching of the wedge 12b. In addition, the X-ray irradiation control unit 11 adjusts the irradiation range (the fan angle or the cone angle) of the X-rays by adjusting a degree of opening of the collimator 12c.

The gantry driving unit 16 allows the X-ray generation device 12 and the detector 13 to rotate about the test object P as a center of rotation along the circular path by driving the rotating frame 15 to rotate.

Every time when the X-ray photon is incident, the detector 13 outputs a signal capable of counting an energy value of the X-ray photon. The X-ray photon is, for example, an X-ray photon which is irradiated by the X-ray tube 12a and transmits through the test object P. The detector 13 has a plurality of detection elements which outputs one pulse of an electric signal (analog signal) every time when the X-ray photon is incident. The photon-counting type X-ray CT apparatus can count the number of X-ray photons incident on each of the detection elements by counting the number of the electric signals (pulses). In addition, the photon-counting type X-ray CT apparatus can measure the energy value of the X-ray photons which causes the output of the signal by performing a calculation process on the signal.

The above-described detection element is, for example, a semiconductor element made of cadmium telluride (CdTe), cadmium zinc telluride (CdZnTe), or the like. In such a case, the detector 13 illustrated in FIG. 1 is a direct-conversion type detector which directly converts the incident X-ray photons to the electric signal. In addition, in some cases, the above-described detection element may be configured with, for example, a scintillator and a photosensor such as a photomultiplier tube. In such a case, the detector 13 illustrated in FIG. 1 is an indirect-conversion type detector which converts the incident X-ray photons into scintillator light by the scintillator and converts the scintillator light into an electric signal by the photosensor such as a photomultiplier tube.

Figure 2:
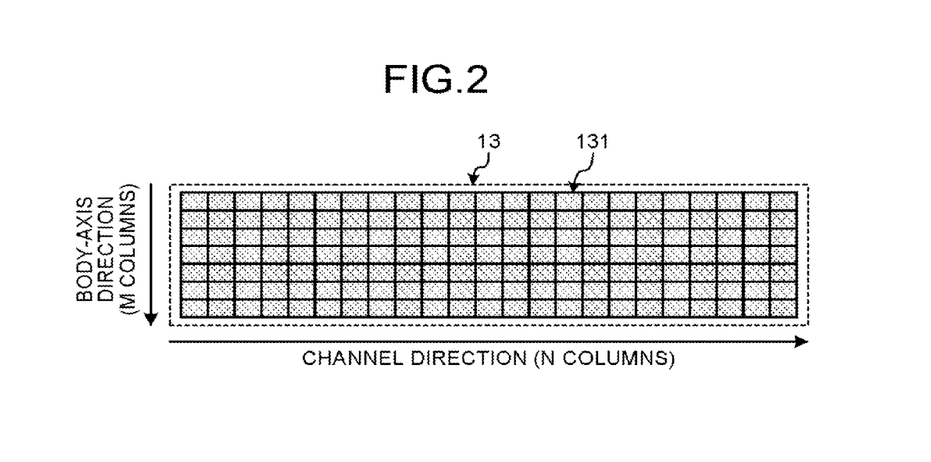
FIG. 2 is a diagram for explaining an example of a detector according to the first embodiment.

FIG. 2 is a diagram for explaining an example of the detector according to the first embodiment. For example, as illustrated in FIG. 2, the detector 13 illustrated in FIG. 1 is a surface detector where N columns of a detection elements 131 made of cadmium telluride are arranged in a channel direction (Y-axis direction in FIG. 1) and M columns of the detection elements 131 are arranged in a body-axis direction (Z-axis direction in FIG. 1). When a photon is incident, the detection element 131 outputs one pulse of the electric signal. The photon-counting type X-ray CT apparatus can count the number of X-ray photons incident on the detection element 131 by discriminating individual pluses output from the detection element 131. In addition, the photon-counting type X-ray CT apparatus can measure the energy values of the counted X-ray photons by performing the calculation process based on the intensities of the pulses.

Herein, the electric signal output from the detection element 131 is output when electrons generated according to the incidence of the X-ray photons move toward a positive-potential collecting electrode. The electric signal output according to the incidence of the X-ray photons is output when holes generated according to the incidence of the X-ray photons move toward a negative-potential collecting electrode.

Returning to FIG. 1, the collecting unit 14 includes an output unit 141, a first collecting unit 142, a second collecting unit 143, and a control circuitry 144 and collects various data by using signals output from the detector 13. More specifically, the collecting unit 14 collects various data by using the signals output from the plurality of the detection elements 131. For example, the collecting unit 14 collects count data obtained by counting photons (X-ray photons) originated from the X-rays transmitting through the test object every energy band and integration data obtained by integrating the signals output from the detection elements 131 at a predetermined time width. Namely, the collecting unit 14 collects photon-counting type data and integration type (current mode measurement type) data of the related art. The output unit 141, the first collecting unit 142, the second collecting unit 143, and the control circuitry 144 will be described later in detail.

The bed device 20 is a device on which the test object P is mounted and includes a top plate 22 and a bed driving unit 21. The top plate 22 is a plate on which the test object P is mounted, and the bed driving unit 21 moves the top plate 22 in the Z-axis direction to move the test object P into the rotating frame 15.

The console device 30 is a device which receives operator's manipulation of the photon-counting type X-ray CT apparatus and reconstructs the X-ray CT image data by using the data collected by the gantry device 10. As illustrated in FIG. 1, the console device 30 includes an input device 31, a display device 32, a scan control unit 33, a pre-processing unit 34, a projection data storage unit 35, an image reconstruction unit 36, an image storage unit 37, and a control unit 38.

The input device 31 includes a mouse, a keyboard, or the like which the operator of the photon-counting type X-ray CT apparatus uses for inputting various instructions or various settings, and the input device transmits information of the instruction or the settings received from the operator to the control unit 38. For example, the input device 31 receives imaging conditions of the X-ray CT image data, reconstruction conditions in the reconstruction of the X-ray CT image data, image processing conditions for the X-ray CT image data, and the like from the operator.

The display device 32 (display unit) is a monitor which the operator refers to. Under the control of the control unit 38, the display device displays the X-ray CT image data to the operator or displays a graphical user interface (GUI) for receiving various instructions or various settings from the operator through the input device 31.

Under the control of the control unit 38 described later, the scan control unit 33 controls a data collection process of the gantry device 10 by controlling operations of the X-ray irradiation control unit 11, the gantry driving unit 16, the collecting unit 14, and the bed driving unit 21.

The pre-processing unit 34 generates projection data by performing a correction process such as a logarithm conversion process, offset correction, sensitivity correction, and beam hardening correction on the data transmitted from the collecting unit 14. More specifically, the pre-processing unit 34 generates the projection data by performing the above-described process on the count data and the integration data transmitted from the collecting unit 14.

The projection data storage unit 35 stores the projection data (the projection data generated from the count data and the projection data generated from the integration data) generated by the pre-processing unit 34. In addition, the projection data storage unit 35 stores the projection data corrected by the image reconstruction unit 36. Namely, the projection data storage unit 35 stores the projection data (corrected count information) for reconstructing the X-ray CT image data.

The image reconstruction unit 36 reconstructs the X-ray CT image data by using the projection data (the projection data generated from the count data and the projection data generated from the integration data) stored in the projection data storage unit 35. The image reconstruction unit 36 may perform the image reconstruction by using various methods as a reconstruction method. For example, the image reconstruction unit 36 reconstructs the X-ray CT image data by a filtered back projection (FBP) method, an iterative method, or the like. In addition, the image reconstruction unit 36 generates image data (display data) by performing various image processes on the X-ray CT image data. The image reconstruction unit 36 stores the reconstructed X-ray CT image data or the image data generated by various image processes in the image storage unit 37. Herein, the image reconstruction unit 36 is called a correction unit and corrects the projection data generated from the count data by using the projection data generated from the integration data and stores the corrected projection data in the projection data storage unit 35. The details of the correction process of the image reconstruction unit 36 will be described later.

Herein, the image reconstruction unit 36 according to the embodiment reconstructs the X-ray CT image data having an improved image quality of the image obtained by the photon counting CT by using the projection data generated from the count data and the projection data generated from the integration data. More specifically, when reconstructing the X-ray image data by using the projection data generated from the count data, the image reconstruction unit 36 performs the reconstruction by using the projection data generated from the integration data. The details of the reconstruction will be described later. The image storage unit 37 stores the X-ray CT image data or the image data (display image). In addition, the image storage unit 37 stores the information on the response function. The details of the information on the response function will be described later.

The control unit 38 performs overall control of the X-ray CT apparatus by controlling operations of the gantry device 10, the bed device 20, and the console device 30. More specifically, the control unit 38 controls the CT scan performed in the gantry device 10 by controlling the scan control unit 33. In addition, the control unit 38 controls the image reconstructing process or the image generating process in the console device 30 by controlling the pre-processing unit 34 or the image reconstruction unit 36. In addition, the control unit 38 controls the display device 32 to display various image data stored in the image storage unit 37.

Heretofore, the overall configuration of the photon-counting type X-ray CT apparatus according to the first embodiment was described. With such a configuration, the photon-counting type X-ray CT apparatus according to the first embodiment improves the image quality of the image obtained by the photon counting CT by the processes of the collecting unit 14 and the image reconstruction unit 36 described in detail hereinafter.

Figure 3:
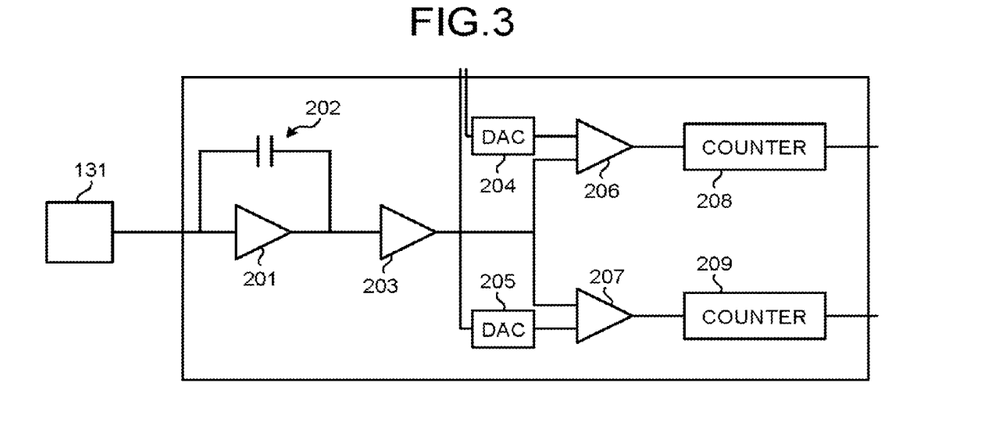
FIG. 3 is a diagram illustrating an example of detection circuitry included in a photon-counting type X-ray CT apparatus of the related art.

First, the case where the image quality is deteriorated in a photon-counting type X-ray CT apparatus of the related art will be described. FIG. 3 is a diagram illustrating an example of a detection circuitry of the photon-counting type X-ray CT apparatus of the related art. For example, in the photon-counting type X-ray CT apparatus of the related art, as illustrated in FIG. 3, a detection circuitry is arranged in the vicinity of a detector to discriminate and count signals output from the detection elements 131. For example, as illustrated in FIG. 3, the detection circuitry of the related art includes a pre-amplifier 201, a condenser 202, a shaper 203, digital-to-analog converters (DACs) 204 and 205, comparators 206 and 207, and counters 208 and 209.

If a signal (charge pulse) is output from the detection element 131, the pre-amplifier 201 and the condenser 202 convert a pulse generated by the charge into a voltage, and output a voltage pulse. Next, the shaper 203 shapes a waveform of the voltage pulse and outputs the waveform-shaped voltage pulse to the comparators 206 and 207. The comparators 206 and 207 compare threshold values obtained by conversion into analog signals in the DACs 204 and 205 with the input voltage pulse, respectively. If the value of the voltage pulse exceeds the threshold value, the comparator outputs an electric signal to the subsequent-stage counter. The counters 208 and 209 count the electric signals output from the comparators 206 and 207.

Figure 4A:
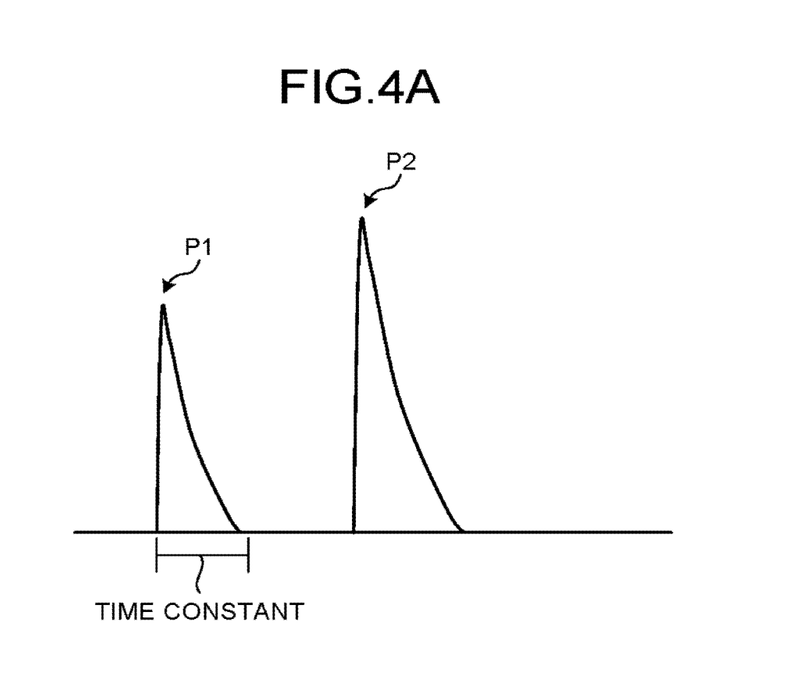
FIG. 4A is a diagram for explaining problems of the related art.
Figure 4B:
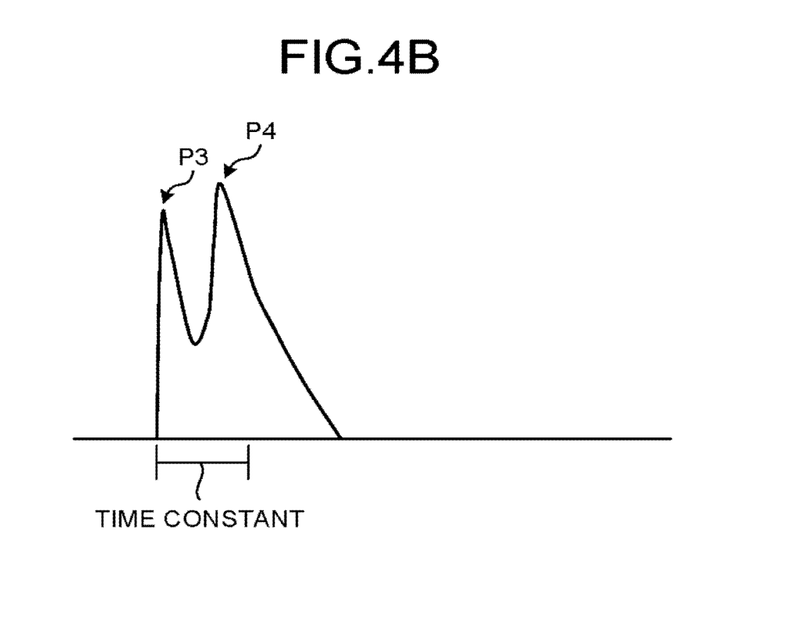
FIG. 4B is a diagram for explaining problems of the related art.

Herein, by setting the threshold value input from the DAC to an arbitrary value, the photons of the X-ray can be counted for every desired energy band. In this manner, in the photon-counting type X-ray CT apparatus of the related art, although the count data are collected by the detection circuitry illustrated in FIG. 3, in the case where the intensity of the X-ray incident on the detection element 131 is strong, the image quality may be deteriorated so as not to discriminate individual pulses. FIG. 4A and FIG. 4B are diagrams for explaining problems of the related art. FIG. 4A illustrates a pulse output in the case where the intensity of the X-ray incident on the detection element 131 is weak. FIG. 4B illustrates a pulse output in the case where the intensity of the X-ray incident on the detection element 131 is strong.

For example, in the case where the intensity of the X-ray is weak, since the incidence interval of the incident photons is sparse, as illustrated in FIG. 4A, two pulses P1 and P2 derived from two photons incident on the same detection element can be discriminated. As illustrated in FIG. 4A, in the photon-counting type X-ray CT apparatus, since a time constant ($\tau$) defined according to the detector and the electric circuitry exists, a response to a signal is defined according to the time constant. For example, in the case where the time constant is 100 ns ($=1 \times 10^7$ s), theoretically, the photons incident with $10^7$ photons/s or more cannot be counted.

The photons of the X-ray counted by the photon-counting type X-ray CT apparatus are not incident with a constant interval, but the photons are incident at random. Therefore, if the intensity of the X-ray is strong, the photons are incident with an interval shorter than the time constant. In such a case, for example, as illustrated in FIG. 4B, a second pulses P4 overlaps a first pulse P3 (pile-up), and thus, the pulses are discriminated as apparently one pulse. Namely, the pulse P3 and the pulse P4 are counted as one pulse P3 by the counter 208 or the counter 209 so as not to be discriminated. As a result, in the photon-counting type X-ray CT apparatus of the related art, data are lost, the value of the voltage pulse is mistaken, and thus, the image quality of the generated image is deteriorated.

With respect to such pile-up, there is known a method of minimizing the deterioration in image quality by changing a response function of a detector. However, since there is a variation in characteristic of a detector system or circuitry system, a variation occurs due to the change in the response function. In addition, since the response function is changed due to a dose of the X-ray, in some cases, the correction cannot be obtained. In this manner, the suppression of deterioration in image quality according to the above-described method has a certain limitation.

Therefore, in the photon-counting type X-ray CT apparatus according to the first embodiment, the image quality of the image obtained by the photon counting CT is improved by processes of the collecting unit 14 and the image reconstruction unit 36. More specifically, the output unit 141 in the collecting unit 14 outputs the signal output from the detector 13 which detects the X-ray to different output destinations. The first collecting unit 142 collects the count data of the photons of the X-ray for every energy band by using the signal output with a predetermined time width among the one signal output from the output unit 141. The second collecting unit 143 collects the integration data obtained by integrating the signal with the predetermined time width by using the signal output with the predetermined time width among the other signal output from the output unit 141. The image reconstruction unit 36 corrects the count data by using the integration data. The image reconstruction unit 36 reconstructs the X-ray CT image data by performing the reconstructing process on the count data which are corrected by using the integration data. The control circuitry 144 in the collecting unit 14 controls the output unit 141, the first collecting unit 142, and the second collecting unit 143.

Namely, the photon-counting type X-ray CT apparatus according to the first embodiment collects the photon-counting type count data and the integration-type integration data, respectively, by using the signals output from the detection elements 131 and performs correction using the integration data at the time of reconstructing the X-ray CT image data by using the projection data generated from the collected count data.

Figure 5:
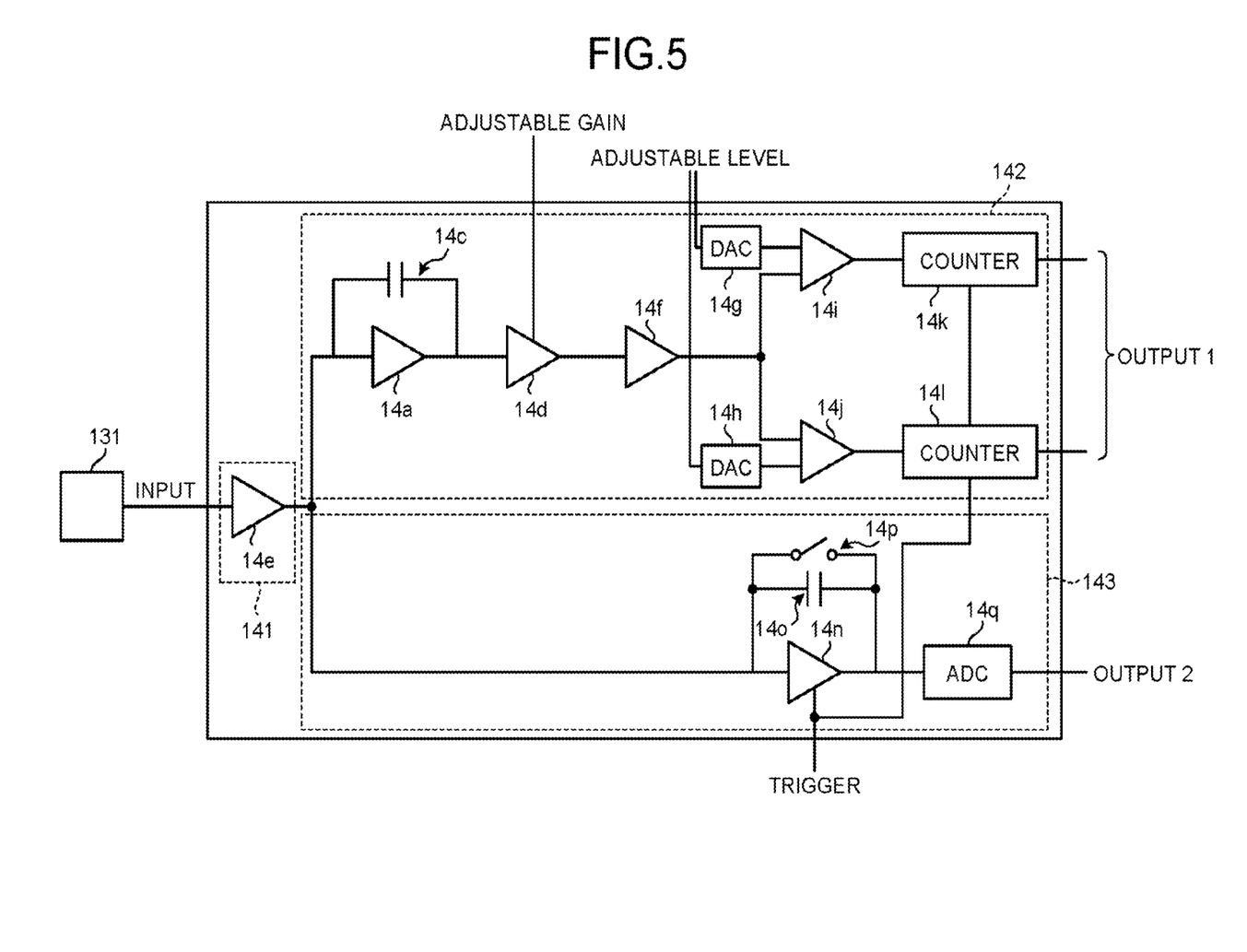
FIG. 5 is a diagram illustrating an example of a detection circuitry according to the first embodiment.

Hereinafter, the process of the detection circuitry for implementing the output unit 141, the first collecting unit 142, and the second collecting unit 143 described above and the process of the image reconstruction unit 36 will be described in detail. FIG. 5 is a diagram illustrating an example of the detection circuitry according to the first embodiment. As illustrated in FIG. 5, the detection circuitry includes a pre-amplifier 14a, a condenser 14c, an amplifier 14d, an amplifier 14e, a shaper 14f, a DAC 14g, a DAC 14h, a comparator 14i, a comparator 14j, a counter 14k, a counter 14l, an amplifier 14n, a condenser 14o, a switch 14p, and an analog-to-digital Converter (ADC) 14q.

Herein, in the detection circuitry illustrated in FIG. 5, as illustrated, the amplifier 14e corresponds to the output unit 141; the shaper 14f, the DAC 14g, the DAC 14h, the comparator 14i, the comparator 14j, the counter 14k, and the counter 14l correspond to the first collecting unit 142; and the amplifier 14n, the condenser 14o, the switch 14p, and ADC 14q correspond to the second collecting unit 143.

The pre-amplifier 14a and the condenser 14c amplify a pulse generated by the signal (charge pulse) which is output from the detection element 131 and is input to the detection circuitry. The amplifier 14d amplifies the voltage pulse according to a gain (adjustable gain) controlled by the control circuitry 144. In addition, the gain controlled by the control circuitry 144 is arbitrarily set (adjusted) by operator's manipulation using the input device 31. For example, the operator performs appropriate settings according to a variation in characteristic of the detector or an imaging mode.

The amplifier 14e corresponding to the output unit 141 outputs a current pulse to circuitry (photon-counting type CT circuitry) corresponding to the first collecting unit 142 and circuitry (integration type CT circuitry) corresponding to the second collecting unit 143, respectively. For example, the amplifier 14e includes a current mirror circuit or a current conveyor circuit to duplicate the input current pulse and output the current pulse to the photon-counting type CT circuitry and the integration type CT circuitry. Namely, the amplifier 14e outputs the same current pulse to the photon-counting type CT circuitry and the integration type CT circuitry.

Here, the amplifier 14e can output a current pulse weighted by using a weighting coefficient to the photon-counting type CT circuitry (circuitry corresponding to the first collecting unit 142) and the integration type CT circuitry (circuitry corresponding to the second collecting unit 143). For example, when the optical sensor which constitutes a detector is avalanche photodiode (APD), silicon photomultiplier, and so on, the optical sensor includes a signal amplification mechanism. Here, when an unweighted current pulse is outputs to the integration type CT circuitry, the integration type CT circuitry is saturated. Therefore, the amplifier 14e multiplies the weighting coefficient and the current pulse so as to reduce the signal level, before outputting the current pulse to the integration type CT circuitry. That is, when the amplifier 14e multiplies the current pulse which is output to the photon-counting type CT circuitry by the weighting coefficient "1", the amplifier 14e reduces the signal level of the current pulse which is output to the integration type CT circuitry by multiplying the current pulse and the weighting coefficient "less than 1". Furthermore, when the same current pulse is output, the amplifier 14e multiplies each of the current pulse which is output to the photon-counting type CT circuitry and the photon-counting type CT circuitry by the weighting coefficient "1", respectively.

Hereinafter, the photon-counting type CT circuitry will be described. The shaper 14f shapes a waveform of the voltage pulse output from the amplifier 14d and outputs the waveform-shaped voltage pulse to the comparator 14i and the comparator 14j. The DAC 14g and the DAC 14h convert the threshold value controlled by the control circuitry 144 into analog signals and outputs the analog signals to the comparator 14i and the comparator 14j, respectively. In addition, the threshold value controlled by the control circuitry 144 is adjusted to an arbitrary level (adjustable level) by operator's manipulation using the input device 31.

The comparator 14i and the comparator 14j compare the threshold values input from the DAC 14g and the DAC 14h with the voltage pulse input from the shaper 14f, respectively. If the intensity of the voltage pulse exceeds the threshold value, the comparator outputs an electric signal to the subsequent-stage counter. The counter 14k and the counter 14l count the electric signals output from the comparator 14i and the comparator 14j and output the count values to the console device 30, respectively. Herein, the counter 14k and the counter 14l performs counting, outputting the count value (Output 1), and resetting the count value based on a trigger signal (Trigger) input from the control circuitry 144. For example, under the control of the scan control unit 33, the control circuitry 144 outputs a trigger signal for every view and controls the counter 14k and the counter 14l so as to output count data in synchronization with the rotation of the rotating frame 15.

In addition, the detection circuitry illustrated in FIG. 5 includes two DACs, two comparators, and two counters so that the count data for two energy bands (energy windows) can be collected. However, the embodiment is not limited thereto, but the detection circuitry may include three or more DACs, three or more comparators, and three or more counters so that the count data for three or more energy bands (energy windows) can be collected.

Next, the integration type CT circuitry will be described. The amplifier 14n and the condenser 14o amplify the current pulse which is output from the amplifier 14e. The condenser 14o stores the current pulse amplified by the amplifier 14e and outputs the stored voltage signal (integration data) to the ADC 14q according to the ON-OFF switching of the switch 14p.

The switch 14p controls the output of the integration data of the condenser 14o by switching ON and OFF based on the trigger signal (Trigger) input from the control circuitry 144. For example, under the control of the scan control unit 33, the control circuitry 144 outputs the trigger signal for every view and controls the switch 14p so as to output the integration data in synchronization with the rotation of the rotating frame 15. The ADC 14q converts the received voltage signal (integration data) into a digital-format electric signal and output the digital-format electric signal (Output 2). In addition, FIG. 5 illustrates the case where the ADC 14q is provided inside the detection circuitry (inside the circuitry corresponding to the second collecting unit). However, the embodiment is not limited thereto, but for example, the ADC 14q may be provided outside the detection circuitry.

In this manner, in the collecting unit 14 according to the first embodiment, the detection circuitry illustrated in FIG. 5 is connected to every detection element 131, and the photon-counting type count data and the integration-type integration data are collected by using the signals output from the detection elements 131. Next, the collecting unit 14 transmits the collected count data and the collected integration data to the pre-processing unit 34 of the console device 30. The pre-processing unit 34 generates projection data of each of the received count data and integration data and stores the projection data in the projection data storage unit 35.

The image reconstruction unit 36 acquires the count data and the integration data stored in the projection data storage unit 35, corrects the count data by using the integration data, and reconstructs the X-ray CT image data from the corrected count data. More specifically, the image reconstruction unit 36 corrects the count data by changing a response function so as to be approximate to the integration data. Namely, the image reconstruction unit 36 corrects the count data by performing a process of allowing the count data which are influenced by pile-up to be approximate to the integration data which are not influenced by pile-up. Herein, the concept of the correction in the image reconstruction unit 36 will be described with reference to FIG. 6.

Figure 6:
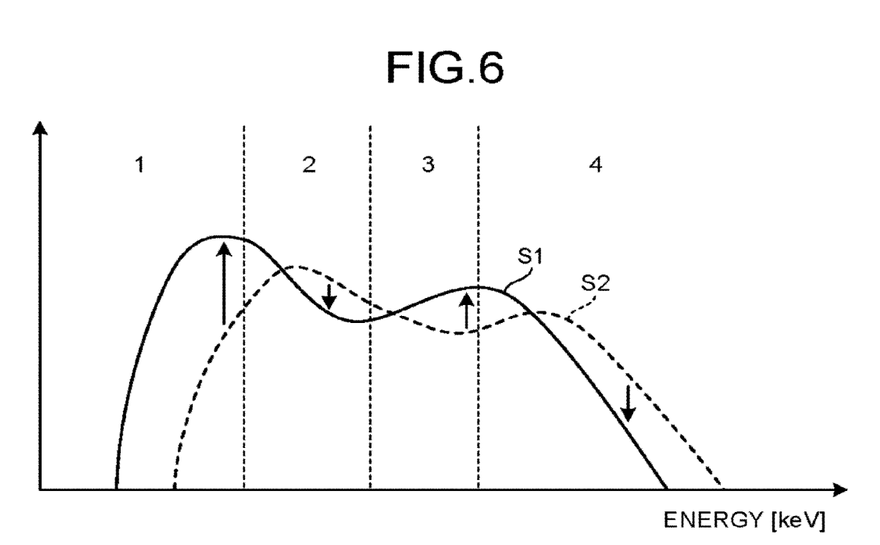
FIG. 6 is a diagram for explaining a process of an image reconstruction unit according to the first embodiment.

FIG. 6 is a diagram for explaining a process of the image reconstruction unit 36 according to the first embodiment. Herein, FIG. 6 illustrates a real energy spectrum S1 and an energy spectrum S2 shifted from the real energy spectrum S1 due to the pile-up. Namely, the energy spectrum S1 indicates the energy spectrum in case of not being influenced by the pile-up, and the energy spectrum S2 indicates the energy spectrum in case of being influenced by the pile-up.

Herein, the integration data are data which are not influenced by the pile-up, and the integration data correspond to the value obtained by integrating the energy spectrum S1 of FIG. 6 while applying weighting to the energy. On the other hand, the corresponding count data are data which are influenced by the pile-up, and the energy spectrum of the count data corresponds to the energy spectrum S2 of FIG. 6. The image reconstruction unit 36 performs the correcting process so that the integration value of the energy spectrum of the count data is approximate to the integration data. Namely, as illustrated by the arrow of FIG. 6, the image reconstruction unit 36 allows the energy spectrum S2 to be approximate to the energy spectrum S1.

For example, the image reconstruction unit 36 changes the response function of the count data expressed by the following Equation (1) so as to be approximate to the integration data expressed by the following Equation (2). Herein, in Equation (1), "$D_{PC(view)}(E)$" represents count data (detected spectrum) in a predetermined view, and "$R_{PC}(E)$" represents a response function of the count data. Herein, "$R_{PC}(E)$" represents a response of the detector 13 and the photon-counting type CT circuitry (photon-counting type system) for a monochromatic X-ray. In addition, in the following Equation (2), "$D_{integ(view)}$" represents integration data in a predetermined view, and "$R_{integ}(E)$" represents a response function of the integration data. Herein, "$R_{integ}(E)$" represents a response of the detector 13 and the integration type CT circuitry (integration type system) for a monochromatic X-ray. In addition, in Equations (1) and (2), "$S(E)$" represents a spectrum of an X-ray generated from the X-ray tube 12a, "$\exp(1-\mu L)$" represents absorption by a test object, and "*" represents convolution.

$$D_{PC(VIEW)}(E) = \{S(E) \times \exp(1-\mu L)\} * R_{PC}(E) \quad (1)$$

$$D_{int\ eg(VIEW)} = \int [\{S(E) \times \exp(1-\mu L)\} * R_{int\ eg}(E)] dE \quad (2)$$

For example, as expressed by Equation (1), the count data are calculated from the X-ray which is generated by the X-ray tube 12a and is absorbed by the test object and the response function of the photon-counting type system. On the other hand, as expressed by Equation (2), the integration data are calculated from the X-ray which is generated by the X-ray tube 12a and is absorbed by the test object and the response function of the integration type system. As expressed in Equations (1) and (2), with respect to the two data, the "$S(E)$" and the "$\exp(1-\mu L)$" are the same, and the response functions are different. Namely, the response function "$R_{PC}(E)$" in Equation (1) is a response function which is influenced by the pile-up, but the response function "$R_{integ}(E)$" is a response function which is not influenced by the pile-up. Therefore, the image reconstruction unit 36 corrects the "$R_{PC}(E)$" by changing the response function "$R_{PC}(E)$" so that image data based on the count data are approximate to image data based on the integration data.

For example, the image reconstruction unit 36 changes the response function "$R_{PC}(E)$" so that image data based on count data expressed by the following Equation (3) are approximate to image data based on integration data expressed by the following Equation (4). Herein, since the integration data include information on all the energy bands, as expressed in Equation (3), with respect to the image data based on the count data, the count data in the predetermined view are summed up by integrating the count data for every energy band in the predetermined view.

$$\int D_{PC(VIEW)}(E) dE \quad (3)$$

$$\int D_{int\ eg(VIEW)}(E) E dE \quad (4)$$

As expressed in Equations (1) and (2), with respect to the count data and the integration data, the "S(E)" and the "exp(1−μL)" are the same, and the response functions are different. Accordingly, if the response function "$R_{PC}(E)$" is corrected accurately, the value of Equation (3) becomes the value of Equation (4). Therefore, as described above, the image reconstruction unit 36 changes the response function "$R_{PC}(E)$" so that the image data based on the count data and the image data based on the integration data are approximate to each other. Accordingly, it is possible to calculate the count data excluding the influence of the pile-up. Herein, the image reconstruction unit 36 uses at least one of energy of the X-ray, an intensity of the X-ray, operating temperature of a system including the detector 13, aging deterioration of the system as a parameter changing the response function "$R_{PC}(E)$".

As described above, the response function is a response of the system to a monochromatic X-ray. Namely, the response function is a function which is changed according to the energy and intensity of the X-ray. In addition, the response function is also changed according to the operating temperature and the aging deterioration of the system. Therefore, the image reconstruction unit 36 changes the response function "$R_{PC}(E)$" by using a response function stored in advance so that the image data based on the count data and the image data based on the integration data are approximate to each other. As an example, the image storage unit 37 stores various response functions in advance, and the image reconstruction unit 36 reads a response function from the image storage unit 37 and uses the response function.

For example, in the cases having the energy of "30 kev" and the intensities of "10 photons/s", "$10^2$ photons/s", "$10^3$ photons/s", "$10^4$ photons/s", "$10^5$ photons/s", $10^6$ photons/s", "$10^7$ photons/s", and $10^8$ photons/s", the response functions are measured for every condition (operating temperature, the number of aging years, and the like) in advance and stored in the image storage unit 37. Similarly, in the cases having the energy of "40 kev", "50 kev", "60 kev", "70 kev", "80 kev", "90 kev", and "100 kev" and the above intensities, the response functions are measured for every condition and stored in the image storage unit 37. The image reconstruction unit 36 reads the response functions and uses the response functions for the above-described correction. As an example, first, the image reconstruction unit 36 reads the response function in the condition of the system at the current time to apply the response function to the above-described Equation (1) and calculates the value of Equation (3) to compare the value of Equation (3) with the value of Equation (4). Herein, if a difference between the value of Equation (3) and the value of Equation (4) exceeds a predetermined threshold value, the image reconstruction unit 36 reads, for example, the response function of the case having the changed intensity and performs the above-described process again. The image reconstruction unit 36 changes the response function until the difference between the value of Equation (3) and the value of Equation (4) is less than the predetermined threshold value.

If the difference between the value of Equation (3) and the value of Equation (4) is less than the predetermined threshold value, the image reconstruction unit 36 derives the "S(E)×exp(1−μL)" of Equation (1) by de-convolution of Equation (1) using the detected spectrum and the response function associated with the difference which is less than the predetermined threshold value for every energy band. The image reconstruction unit 36 calculates the absorption "exp(1−μL)" of the test object by dividing the derived "S(E)×exp(1−μL)" by the existing "S(E)". The image reconstruction unit 36 performs the above-described process on every view to calculate "exp(1−μL)" for every energy band of each view and to generate the X-ray CT image data (reconstructed image) by using the calculated "exp(1−μL)".

In addition, the above-described examples are exemplary ones, and the embodiment is not limited thereto. Namely, the response functions stored in advance are not limited to the above-described examples, but in some cases, a response function in an arbitrary condition may be measured in advance to be stored. In addition, the number of parameters changing the response function is not only four as described above, but the number of parameters may be arbitrarily set. For example, in some cases, a variation in response for each circuitry (irregularity occurring during the production) may be used. In addition, the response function may be changed not only by changing the intensity of an X-ray but also by changing an arbitrary condition. For example, in some cases, the response function may be changed by changing the energy.

With respect to the response of the system, the relationship between the real incident X-ray and the detected X-ray is maintained a linear relationship up to a certain point. However, if the intensity of the X-ray is increased, the response of the system is in a saturated state. In other words, as the intensity of the X-ray is increased, although the incident X-ray is increased, the detected X-ray is not changed. Therefore, in the case of the intensity where the pile-up occurs, it is possible to perform correction more accurately by changing the response function by using the intensity as a parameter.

For example, in the case of reconstructing the X-ray CT image data from the count data for the energy bands "1" to "4" illustrated in FIG. 6, first, the image reconstruction unit 36 performs the above-described correcting process so that the integration value of the energy spectrum of the count data is approximate to the integration data corresponding to the energy spectrum S1. Next, the image reconstruction unit 36 reconstructs the X-ray CT image data of the energy bands "1" to "4" by using the data after the correcting process. In addition, in some cases, the reconstruction of the X-ray CT image data from the count data for the energy bands may be performed sequentially for the energy bands or may be performed simultaneously in parallel.

As described above, the image reconstruction unit 36 corrects the count data which are influenced by the pile-up by using the integration data which are not influenced by the pile-up and reconstructs the X-ray CT image data by using the corrected count data. Accordingly, by generating a display image by using the X-ray CT image data reconstructed as described above, a high-quality display image which is not influenced by the pile-up can be generated to be displayed. For example, the image reconstruction unit 36 may allocate colors corresponding to the energy bands to pixels of the X-ray CT image data of the energy bands and may generate a plurality of display images classified according to the energy bands or a superposed image obtained by superposing the plurality of the display images at a high image quality.

In order to improve the processing rate by reducing the number of processing steps of the reconstructing process, the image reconstruction unit 36 reconstructs the X-ray CT image data from the count data by iterative reconstruction using the image data based on the integration data as an initial image. For example, when reconstructing the X-ray CT image data from the count data by using an iterative method such as an ART method, an SIRT method, an ML-EM method, and an OS-EM method, the image reconstruction unit 36 uses the integration data as an initial image.

For example, the image reconstruction unit 36 uses a projection data of the integration data of a predetermined view as an initial image and calculates a ratio (or a difference) to the count data after the correction of the corresponding view to generate an reverse-projection image by reversely projecting the calculated ratio (or the difference). Next, the image reconstruction unit 36 generates (feeds back) an updated image by multiplying (or adding) the generated reverse-projection image and the initial image and repetitively performs the above-described process by using the generated updated image as an initial image until the above-described process converges. The image reconstruction unit 36 uses the integration data as an initial image and reconstructs the X-ray CT image data of the count data after the correction for every energy band.

As described above, by using the projection data of the integration data as an initial image, it is possible to reduce the number of processing steps until the iterative converges, so that it is possible to shorten the time until the display image is generated and displayed. As a result, the photon-counting type X-ray CT apparatus according to the first embodiment can improve diagnosis efficiency.

In addition, in the photon-counting type X-ray CT apparatus according to the first embodiment, it is also possible to improve the workflow according to the diagnosis by displaying the display image based on the integration data. More specifically, in the photon-counting type X-ray CT apparatus according to the first embodiment, when the CT scan is performed on the test object and the count data and the integration data are collected, the image reconstruction unit 36 reconstructs the X-ray CT image data from the projection data of the integration data by an FBP method or the like while performing the above-described correction of the count data and the above-described reconstructing process. Next, the image reconstruction unit 36 generates the display image by using the X-ray CT image data reconstructed from the projection data of the integration data and stores the display image in the image storage unit 37. The control unit 38 displays the stored display image in the display device 32. Namely, when the image data are reconstructed from the count data by the image reconstruction unit 36, the control unit 38 controls the display device 32 to display the display image based on the integration data.

In the case of performing image reconstruction on the count data after the correction for every energy band according to an iterative method, a time may be required to generate and display the display image. Therefore, as described above, the operator can speedily check the image by using the display image based the integration data as a preview, so that the time taken until determining whether or not to re-image may be shortened. Herein, in the case of perform re-imaging as a result of observing the display image based on the integration data, the operator may stop the reconstruction of the X-ray CT image data from the count data by manipulating the input device 31 and perform the re-imaging. Namely, the image reconstruction unit 36 stops the reconstruction of the count data based on an instruction according to a result of the observation of the display image based on the integration data displayed by the display device 32.

Figure 7:
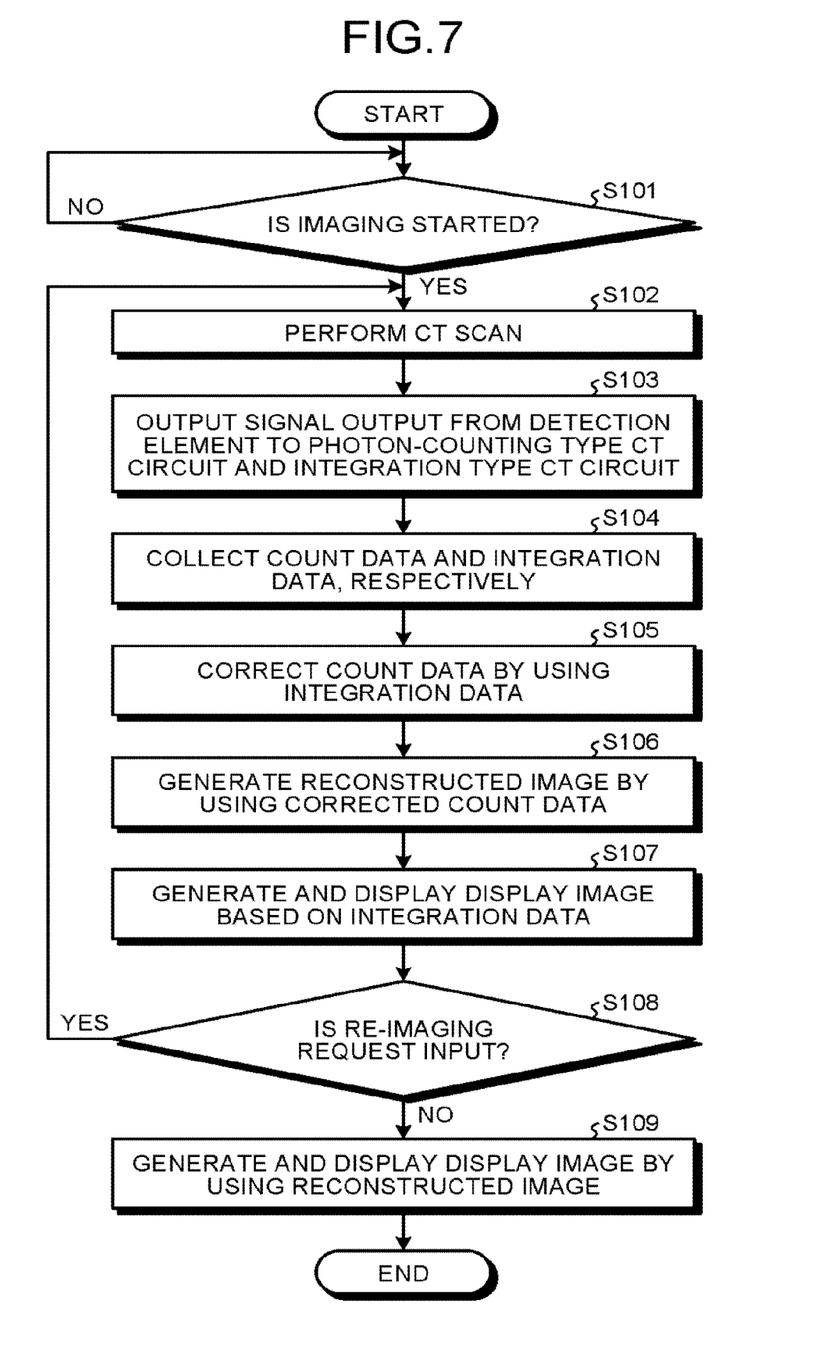
FIG. 7 is a flowchart for explaining an example of a process of the photon-counting type X-ray CT apparatus according to the first embodiment.

Next, the process of the photon-counting type X-ray CT apparatus according to the first embodiment will be described with reference to FIG. 7. FIG. 7 is a flowchart for explaining an example of the process of the photon-counting type X-ray CT apparatus according to the first embodiment.

As illustrated in FIG. 7, the control unit 38 in the photon-counting type X-ray CT apparatus according to the first embodiment determines whether or not an imaging start request from the operator is received (step S101). In the case where the imaging start request is not received (No in step S101), the control unit 38 waits until the imaging start request is received.

On the other hand, in the case where the imaging start request is received (Yes in step S101), the control unit 38 performs CT scan based on an X-ray irradiation condition received together with the imaging start request (step S102). Next, the output unit 141 (amplifier 14e) outputs the signals output from the detection elements to the photon-counting type CT circuitry and the integration type CT circuitry (step S103). The photon-counting type CT circuitry and the integration type CT circuitry collect the count data and the integration data, respectively (step S104).

Next, the image reconstruction unit 36 corrects the count data by using the integration data (step S105) and generates the reconstructed image (X-ray CT image data) by using the corrected count data (step S106). The image reconstruction unit 36 generates the display image based on the integration data, and the control unit 38 controls the display device 32 to display the display image (step S107), and the control unit 38 determines whether or not a re-imaging request is input (step S108).

In the case where the re-imaging request is input (Yes in step S108), the control unit 38 controls the image reconstruction unit 36 to stop the reconstruction of the count data and returns to step S102 to perform the CT scan based on a newly-input imaging condition or the like. On the other hand, in the case where the re-imaging request is not input (No in step S108), the image reconstruction unit 36 generates the display image by using the reconstructed image, and the control unit 38 controls the display device 32 to display the display image (step S109) and ends the process.

As described above, according to the first embodiment, the output unit 141 outputs the signal output from the detector which detects the X-ray to different output destinations. The first collecting unit 142 collects the count data of the photons of the X-ray for every energy band by using the signal output with a predetermined time width among the one signal output from the output unit 141. The second collecting unit 143 collects the integration data obtained by integrating the signal with the predetermined time width by using the signal output with the predetermined time width among the other signal output from the output unit 141. The image reconstruction unit 36 corrects the count data by using the integration data. The image reconstruction unit 36 generates the reconstructed image by performing the reconstructing process on the corrected count data. Therefore, the photon-counting type X-ray CT apparatus according to the first embodiment can improve the image quality of the image obtained by the photon counting CT. For example, in the photon-counting type X-ray CT apparatus according to the first embodiment, since circuitry system retains a sufficient capacity based on an assumption of a high dose, linear output is available in a wide range from a low dose to a high dose, so that it is possible to suppress a deterioration in image quality without a change in response of the detector and the circuitry according to the dose.

In addition, according to the first embodiment, the image reconstruction unit 36 reconstructs the X-ray CT image data from the count data by the iterative reconstruction using the image data based on the integration data as an initial image.

Therefore, the photon-counting type X-ray CT apparatus according to the first embodiment can speedily display a high-quality image.

In addition, according to the first embodiment, the image reconstruction unit 36 corrects the count data by changing the response function for the count data so as to be approximate to the integration data. In addition, the image reconstruction unit 36 uses at least one of the energy of the X-ray, the intensity of the X-ray, the operating temperature of the system including the detector, and the aging deterioration of the system as parameters changing the response function for the count data. Therefore, even in the case where the intensity of the X-ray is strong, the photon-counting type X-ray CT apparatus according to the first embodiment can display the photon counting CT image which is not influenced by the pile-up.

In addition, according to the first embodiment, while the image data are reconstructed from the count data by the image reconstruction unit 36, the control unit 38 controls the display device 32 (display unit) to display the display image based on the integration data. Therefore, the photon-counting type CT apparatus according to the first embodiment can speedily display the diagnosis image, so that it is possible to improve the workflow associated with the diagnosis.

In addition, according to the first embodiment, the image reconstruction unit 36 stop the reconstruction of the count data based on an instruction received when the display device 32 displays the display image. Therefore, the photon-counting type X-ray CT apparatus according to the first embodiment can improve the workflow associated with the diagnosis.

In addition, according to the first embodiment, the output unit 141 is a current mirror circuit or a current conveyor circuit. Therefore, the photon-counting type X-ray CT apparatus according to the first embodiment can collect the count data and the integration data, respectively, from the same signal, so that it is possible to perform correct accurately.

Second Embodiment

Figure 8:
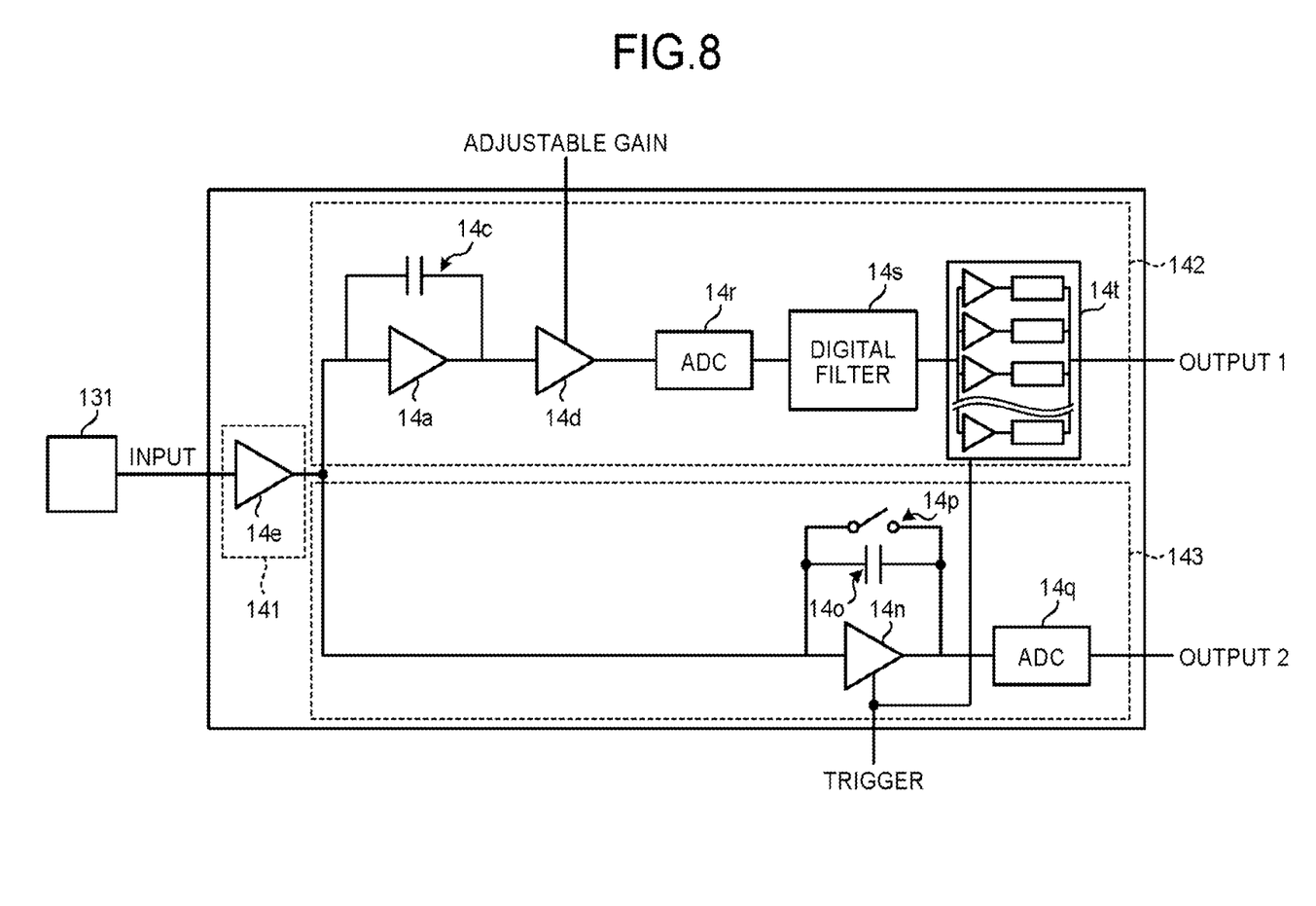
FIG. 8 is a diagram illustrating an example of a detection circuitry according to a second embodiment.

In the first embodiment, the case of using the detection circuitry illustrated in FIG. 5 was described. In a second embodiment, the case of using a different detection circuitry will be described. FIG. 8 is a diagram illustrating an example of detection circuitry according to the second embodiment. The detection circuitry of FIG. 8 is different from the detection circuitry of FIG. 5 only in terms of the circuitry (photon-counting type CT circuitry) corresponding to the first collecting unit 142. Hereinafter, this point will be mainly described.

As illustrated in FIG. 8, the photon-counting type CT circuitry according to the second embodiment includes an ADC 14r, a digital filter 14s, and a counter group 14t. The ADC 14r converts the voltage pulse output from the amplifier 14d into a digital signal and outputs the digital signal to the digital filter 14s. The digital filter 14s performs gain correction, pile-up correction, and the like on the digital signal input from the ADC 14r to convert the digital signal into the corresponding energy value.

Figure 9:
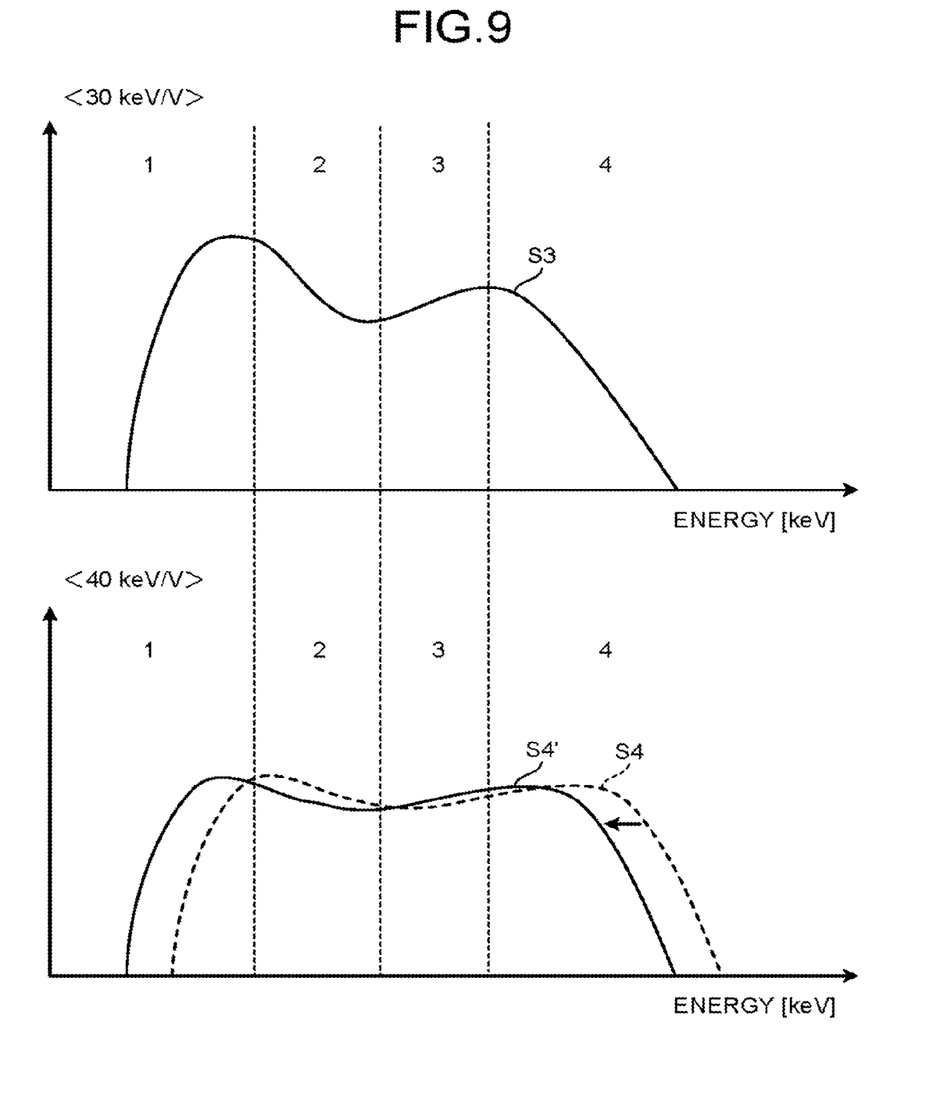
FIG. 9 is a diagram for explaining gain correction according to the second embodiment.

FIG. 9 is a diagram for explaining the gain correction according to the second embodiment. For example, in the X-ray CT apparatus, a conversion ratio (gain) of voltage and energy is different according to the pixels. As an example, as illustrated in FIG. 9, there are a pixel having a gain of "30 kev/V" of converting "1 V" into "30 kev", a pixel having a gain of "40 kev/V" of converting "1 V" into "40 kev", and the like. Herein, for example, if the energy bands "1" to "4" illustrated in FIG. 9 are defined by using "30 kev/V" (if the energy bands are defined like the upper graph of FIG. 9), an accurate energy spectrum cannot be obtained in the lower graph of FIG. 9 (pixel of 40 kev/V). As an example, in the case where the settings are made to be discriminated by the energy bands "1" to "4" as illustrated in FIG. 9, the threshold value of "30 kev" set to the pixel having a gain of "30 kev/V" corresponds to "40 kev" in the pixel having a gain of "40 kev/V", so that the energy spectrum S3 and the energy spectrum S4 are not accurately discriminated in the same condition.

Therefore, as illustrated in the lower graph of FIG. 9, the digital filter 14s performs the correction so as to shift the energy spectrum S4 to the energy spectrum S4'. In addition, at the same time, the digital filter 14s can appropriately perform the existing pile-up correction.

As illustrated in FIG. 8, the counter group 14t includes a plurality of comparators and counters corresponding to the comparators and counts the signals input through the digital filter 14s and outputs the count data to the console device 30 (Output 1). The counter group 14t is controlled by the control circuitry 144 to output the count data for every band to the console device 30 according to the control. The count data output from the counter group 14t are output all at once in a state designated by the operator through the input device 31.

As described above, the second embodiment can be applied to the case of counting the count data from digital data, so that the photon-counting type X-ray CT apparatus according to the second embodiment can easily improve the image quality of the image obtained by the photon counting CT.

Third Embodiment

Although the first and second embodiments are described heretofore, besides the above-described first and second embodiments, various other forms may be embodied.

In the above-described first and second embodiments, the case where the collecting unit 14 includes the detection circuitry is described. However, the embodiment is not limited thereto, but for example, the detector 13 may include the detection circuitry. In such a case, the detector 13 includes the output unit 141, the first collecting unit 142, the second collecting unit 143, and the control circuitry 144.

In addition, components of the apparatuses illustrated in the first and second embodiments are functional, conceptual ones, and thus, the components need not to be configured with physical ones. Namely, specific forms of distribution and integration of the devices are not limited to the illustrated ones, but the entire or a portion thereof may be configured to be distributed or integrated functionally or physically in an arbitrary unit according to various loads, usage situation, or the like. In addition, the entire or an arbitrary portion of processing functions performed in the devices may be embodied by a CPU and programs analyzed and executed by the CPU or may be embodied by hardware using wired logic.

In addition, the control method described in the first and second embodiments may be embodied by a computer such as a personal computer, a workstation, or the like executing a control program which is prepared in advance. The control program may be distributed via a network such as the Internet. In addition, the control program may be recorded in a computer-readable recording medium such as a hard disk, a flexible disk (FD), a CD-ROM, an MO, and a DVD to be executed by being read from the recording medium by a computer.

Heretofore, as described above, according to the first to third embodiments, it is possible to improve an image quality of an image obtained by photon counting CT.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A photon-counting type X-ray CT apparatus, comprising:
    a detector configured to detect X-rays and output a signal; and
    processing circuitry configured to
        collect count data of photons of the X-rays for every energy band with a predetermined time width by using the signal output from the detector,
        collect integration data obtained by integrating the signal with the predetermined time width by using the signal output from the detector,
        correct the count data by using the integration data, and
        generate a reconstructed image by performing a reconstructing process on the corrected count data, wherein the processing circuitry is further configured to generate the reconstructed image by iterative reconstruction of the corrected count data using, as an initial image, image data generated based on the integration data.

2. The photon-counting type X-ray CT apparatus according to claim 1, wherein the processing circuitry is further configured to correct the count data by changing a response function for the count data so as to be approximate to the integration data.

3. The photon-counting type X-ray CT apparatus according to claim 2, wherein the processing circuitry is configured to use at least one of an energy of the X-rays, an intensity of the X-rays, an operating temperature of a system including the detector, and an aging deterioration of the system as a parameter for changing the response function for the count data.

4. The photon-counting type X-ray CT apparatus according to claim 1, wherein the processing circuitry is further configured to cause a display to display a display image based on the integration data when the reconstructed image is generated from the count data.

5. The photon-counting X-ray CT apparatus according to claim 2, wherein the processing circuitry is further configured to cause a display to display a display image based on the integration data when the reconstructed image is generated from the count data.

6. The photon-counting X-ray CT apparatus according to claim 3, wherein the processing circuitry is further configured to cause a display to display a display image based on the integration data when the reconstructed image is generated from the count data.

7. The photon-counting type X-ray CT apparatus according to claim 4, wherein the processing circuitry is further configured to stop the reconstructing process on the corrected count data based on an instruction received during the displaying of the display image on the display.

8. The photon-counting type X-ray CT apparatus according to claim 5, wherein the processing circuitry is further configured to stop the reconstructing process on the corrected count data based on an instruction received during the displaying of the display image on the display.

9. The photon-counting type X-ray CT apparatus according to claim 6, wherein the processing circuitry is further configured to stop the reconstructing process on the corrected count data based on an instruction received during the displaying of the display image on the display.

10. The photon-counting type X-ray CT apparatus according to claim 1, wherein the signal is output by a current mirror circuit or a current conveyor circuit.

11. A photon-counting type X-ray CT apparatus, comprising:
    a detector configured to detect X-rays and output a signal; and
    processing circuitry configured to
        collect count data of photons of the X-rays for every energy band with a predetermined time width by using the signal output from the detector,
        collect integration data obtained by integrating the signal with the predetermined time width by using the signal output from the detector,
        correct the count data by using the integration data, and
        generate a reconstructed image by performing a reconstructing process on the corrected count data, wherein the processing circuitry is configured to correct the count data by changing a response function for the count data so as to be approximate to the integration data.

12. A photon-counting type X-ray CT apparatus, comprising:
    a plurality of detection elements configured to detect X-rays and output a signal respectively; and
    processing circuitry configured to
        duplicate the signal output from a given detection element of the plurality of detection elements to generate duplicated signals,
        collect count data of photons of the X-rays for every energy band with a predetermined time width by using one of the duplicated signals,
        collect integration data obtained by integrating the signal with the predetermined time width by using the other of the duplicated signals,
        correct the count data by using the integration data, and
        generate a reconstructed image by performing a reconstructing process on the corrected count data.

* * * * *